(12) United States Patent
Petersen et al.

(10) Patent No.: US 9,272,312 B1
(45) Date of Patent: Mar. 1, 2016

(54) METHODS AND SYSTEMS FOR REMOVING LUBRICANTS FROM SUPERPLASTIC-FORMING OR HOT-FORMING DIES

(71) Applicant: The Boeing Company, Seal Beach, CA (US)

(72) Inventors: Marc James Petersen, Tacoma, WA (US); Larry Dean Hefti, Auburn, WA (US); Gregory L. Ramsey, Seabeck, WA (US)

(73) Assignee: The Boeing Company, Chicago, IL (US)

( * ) Notice: Subject to any disclaimer, the term of this patent is extended or adjusted under 35 U.S.C. 154(b) by 515 days.

(21) Appl. No.: 13/732,692

(22) Filed: Jan. 2, 2013

(51) Int. Cl.
*B08B 6/00* (2006.01)
*B08B 7/00* (2006.01)
*B23K 26/00* (2014.01)
*B23K 26/36* (2014.01)

(52) U.S. Cl.
CPC ............... *B08B 7/0042* (2013.01); *B08B 7/00* (2013.01); *B08B 7/005* (2013.01); *B08B 7/0035* (2013.01); *B08B 7/0057* (2013.01); *B23K 26/006* (2013.01); *B23K 26/36* (2013.01); *B23K 26/365* (2013.01)

(58) Field of Classification Search
CPC .... B23K 26/006; B23K 26/36; B23K 26/365; B08B 7/00; B08B 7/005; B08B 7/0035–7/0057; H01J 49/0418
See application file for complete search history.

(56) References Cited

U.S. PATENT DOCUMENTS

| | | | | |
|---|---|---|---|---|
| 3,701,379 A * | 10/1972 | Fassler et al. | ............... | 164/132 |
| 5,467,626 A * | 11/1995 | Sanders | ............... | 72/60 |
| 5,643,367 A * | 7/1997 | Viel | ............... | 134/1 |
| 6,140,659 A * | 10/2000 | Shizuka | ............... | 250/504 R |
| 6,410,883 B1 * | 6/2002 | Furuta | ............... | 219/121.68 |
| 6,516,645 B2 * | 2/2003 | Morales et al. | ............... | 72/53 |
| 6,576,867 B1 * | 6/2003 | Lu et al. | ............... | 219/121.69 |
| 7,525,065 B2 | 4/2009 | Engler et al. | | |
| 8,030,594 B2 | 10/2011 | Thomas et al. | | |
| 2002/0129832 A1 * | 9/2002 | Drzal et al. | ............... | 134/1 |
| 2004/0129052 A1 * | 7/2004 | Krajewski et al. | ............... | 72/347 |
| 2006/0112753 A1 * | 6/2006 | Friedman et al. | ............... | 72/426 |
| 2011/0147354 A1 | 6/2011 | Ream et al. | | |
| 2013/0087949 A1 * | 4/2013 | Kitahara | ............... | 264/400 |

FOREIGN PATENT DOCUMENTS

EP 0233755 * 8/1987

* cited by examiner

*Primary Examiner* — Bibi Carrillo
(74) *Attorney, Agent, or Firm* — Armstrong Teasdale LLP

(57) ABSTRACT

A method of cleaning a superplastic-forming or a hot-forming die includes exposing a surface of the die having a lubricant thereon to electromagnetic energy. The electromagnetic energy removes the lubricant without removing an oxide layer between the die surface and the lubricant.

15 Claims, 2 Drawing Sheets

METHODS AND SYSTEMS FOR REMOVING LUBRICANTS FROM SUPERPLASTIC-FORMING OR HOT-FORMING DIES

FIELD

The field of the disclosure relates generally to cleaning manufacturing dies, and more specifically, to methods and systems for removing lubricants from superplastic-forming or hot-forming manufacturing dies.

BACKGROUND

Forming methods for metal components include superplastic forming and hot forming of components. Typically, a metal die, such as a stainless steel die, is first treated such that an oxide layer, e.g., a nickel oxide layer, is formed on its working surface. A lubricant is sprayed on or otherwise applied over the oxide layer of the die. The metal die is then heated, either alone or together with the metal to be formed, and once the desired temperature is achieved, the metal is formed against the die, e.g., using a compressed gas, to form the component. After a number of components have been formed, the lubricant becomes baked onto the die, and must occasionally be removed and reapplied, while preserving the oxide layer underneath, before additional components may be formed with the die.

Typically, the baked-on lubricant is removed manually. The operator uses e.g. a pneumatic rotary tool and an abrasive pad to grind away the baked-on lubricant. However, this cleaning process is tedious, time consuming, and may remove or disrupt the beneficial oxide layer on the working surface of the die.

FIG. 1 is a schematic diagram of a component-forming system 100. The component-forming system 100 includes a die 102, a lower platen 104, an upper platen 106, and a gas inlet 108. The component-forming system 100 may be a superplastic-forming system or a hot-forming system.

The die 102 is fabricated from a rigid, temperature-resistant material. In embodiments, the die 102 is a superplastic forming die or a hot-forming die. The die 102 includes a working surface 110 that is shaped to provide a component to be formed therein with a desired profile. The working surface 110 includes one or more raised or indented portions, configured to provide the shape of the component to be formed therein.

The working surface 110 is coated with an oxide layer 101 for wear resistance and to prevent the formed part from sticking to the die surface, for example as shown in the enlarged section view of FIG. 1. The system 100 may include a top cover 112 that seals against the die 102 at a seal bead 114. In one example, the seal bead 114 includes a seal or gasket for improved sealing of the top cover 112 to the die 102. In another example, the seal bead 114 is formed on the die 102 and the cover is sealed to the die using an adhesive, mechanical means, such as a clamp, or other sealing devices such as a hydraulic press that allow the component forming system to function as described herein. When the top cover 112 is sealed to the die 102, a forming chamber 116 is defined as a space between the top cover 112 and die working surface 110.

The gas inlet 108, formed for example in the top cover 112, is in flow communication with the forming chamber 116. A supply of pressurized gas (not shown) is provided to the forming chamber 116 through the gas inlet 108 to apply a pressure within the forming chamber 116. A gas discharge 118 is in flow communication with the forming chamber 116, and allows gas supplied via the inlet 108 to exit the forming chamber 116.

In operation, the die 102 is first coated with a lubricant 103, such as graphite and/or boron nitride. As used herein, lubricant 103 refers to lubricants that are not paints. Typically, the lubricants are sprayed onto the working surface 110 of the die 102 to form a substantially uniform layer of lubricant 103. However, other methods of applying the lubricant 103 may be used, such as wiping, dipping, rolling and the like. After the lubricant 103 has been applied to the die, a material stock 120 is placed into die 102. Material stock 120 may be a metal or plastic material to be formed, such as titanium, aluminum, nickel, other metals and metal alloys or combinations thereof. The top cover 112 is closed and the die 102 is heated by a heater (not shown). The die 102 is heated until the material stock 120 reaches a predetermined temperature of approximately between 850 degrees to 1800 degrees Fahrenheit (454° C. to 983° C.), depending on the forming process and material being formed. The die 102 and the cover 112 are placed between the lower platen 104 and the upper platen 106 and a pressure is applied to one or both of the platens.

The heated material stock 120 is then biased against the working surface 110 by pressure exerted by the pressurized gas supplied through the inlet 108. The pressure is applied to the material stock 120 until the material stock takes the shape of the working surface 110, and a component 122 is formed. The formed component 122 is then removed from the die 102. The above described forming procedure may be performed one or more times before spent lubricant is removed and new lubricant is applied to the die. Alternatively, it may be necessary to remove old lubricant 103 and apply a new layer of lubricant to the die 102 after each component 122 is formed and removed from the die.

SUMMARY

Accordingly, it is desirable to provide an improved method and apparatus for removing a lubricant from a forming die.

In one aspect, a method of cleaning a die having an oxide layer includes exposing a working surface of the die having a lubricant thereon to electromagnetic energy, consistent with a set of operating parameters, to remove the lubricant without removing the oxide layer between the surface of the die and the lubricant.

In another aspect, a cleaning system for removing a lubricant from a working surface of a forming die having an oxide layer is described. The cleaning system removes the lubricant without removing the oxide layer. The cleaning system includes an electromagnetic energy output device configured to deliver a beam of electromagnetic energy to the working surface and a controller operatively coupled with the electromagnetic energy output device. At least one operating parameter of the electromagnetic energy output device is adjustable by the controller. The at least one operating parameter includes at least one of an electromagnetic energy power level, a speed at which the beam of the electromagnetic energy traverses the working surface, and a number of times the beam traverses the working surface along at least a portion of a previously traversed path. A capture device is provided to collect an effluent generated during operation of the electromagnetic energy output device.

In yet another aspect, a method of cleaning a die includes analyzing a working surface of the die with an analyzing device to determine a thickness of a lubricant thereon. Operating parameters of an electromagnetic-energy emission device (EEED) are controlled to irradiate the surface of the die with electromagnetic energy such that the electromagnetic energy removes the lubricant without removing an oxide layer between the working surface and the lubricant.

DETAILED DESCRIPTION

Figure 1:
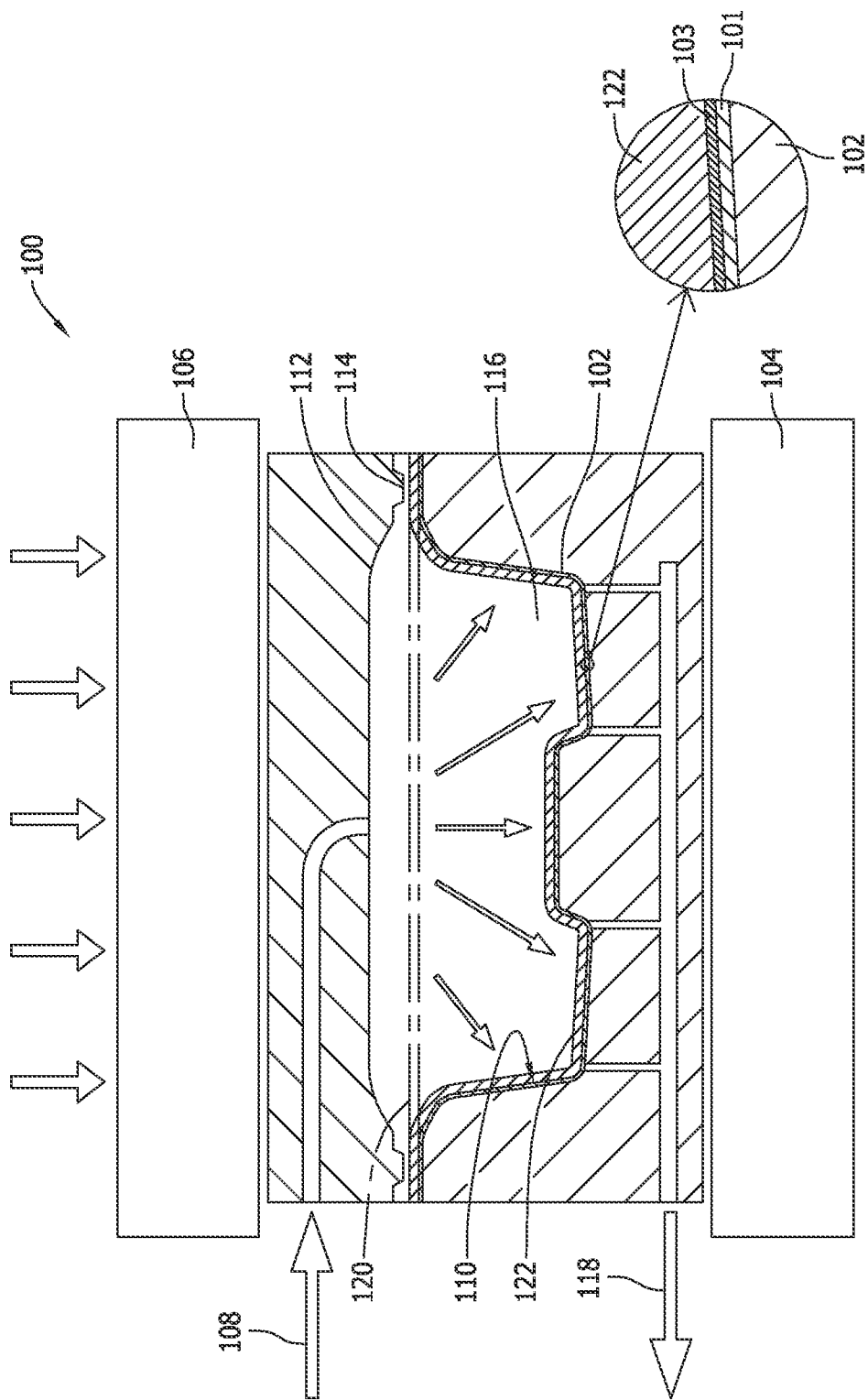
FIG. 1 is a schematic view of a component forming die.
Figure 2:
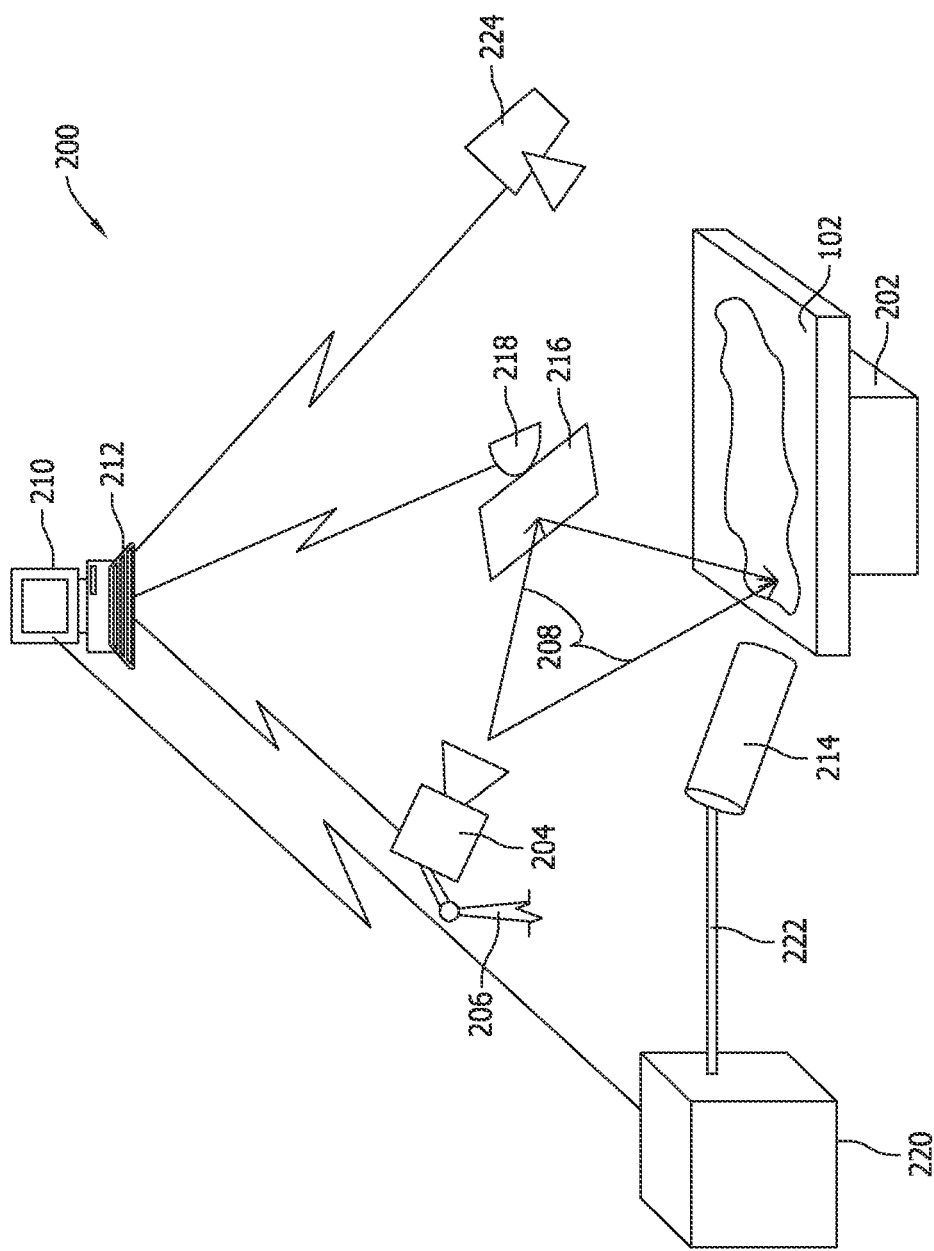
FIG. 2 schematically shows an exemplary optical cleaning system for a forming die.

After the component 122 has been removed from the die 102, the die 102 may be cooled to room temperature and cleaned using an exemplary cleaning system 200 best shown in FIG. 2. In one example, the die 102 is placed onto a holder 202 that supports the die 102 during the cleaning operation. The holder 202 may include a device configured for rotational and/or translational movement, which allows the die 102 to move, rotate and/or translate with respect to one or more other components of cleaning system 200. For example, in one embodiment, the holder 202 moves the die with respect to a beam of electromagnetic energy emitted from the emission device (EEED) 204. In one aspect, the holder 202 is also configured to align the die 102 with respect to one or more other components of the cleaning system 200.

The cleaning system 200 includes an electromagnetic-energy emission device (EEED) 204, such as a laser having a power output of between about 8 kilowatts (kW) to about 15 kW. In one embodiment, the EEED 204 is a fiber laser, such as a 15 kw fiber laser manufactured by IPG (Oxford, Mass.) or Fraunhofer (Munich, Germany). In other embodiments, the EEED 204 may be any electromagnetic-energy emission device capable of functioning as described herein. The EEED 204 is configured to emit a beam 208 of electromagnetic energy capable of ablating a lubricant 103 from a surface of the die 102, as discussed further herein. Suitable lubricants include graphite and Boron Nitride or the like. In one embodiment, the EEED 204 is coupled to a movable arm 206 that provides a movement, or steering capability to direct the beam 208 in a desired direction toward die 102. In some variants, the EEED outputs between about 12 kW and about 15 kW of power.

In one example, a scanning device 216, which may also be referred to herein as a scanner, is provided to enable direction and/or distribution (e.g., spreading and/or focusing) of the beam 208 onto the die 102. The scanning device 216 may be a reflective device capable of reflecting or directing the beam 208 onto a surface of the die 102, such as a mirror. In one such embodiment, the scanning device 216 is a faceted rotating mirror, such as a scanner manufactured by EWI® (Columbus, Ohio). In other embodiments, scanning device 216 is an oscillating reflective surface having a flat or contoured shape. In some variants, the scanning device 216 has a parabolic shape for concentrating the electromagnetic energy. In yet another embodiment, scanning device 216 may be controlled or otherwise adjusted by adjusting device 218 to control parameters such as raster speed, laser spot size and laser energy density. In one alternative, the scanning device 216 may be omitted, with EEED 204 emitting the beam 208 directly onto the die 102.

In one example, an effluent-capture device 214 is provided proximate the scanning device 216 or die 102. The effluent-capture device 214 may be a vacuum device, or other device capable of capturing effluents generated during the cleaning operation of the die 102. Such effluents may include vaporized particles of lubricant 103 that have been ablated from the working surface 110 of the die 102. The effluent-capture device 214 may be connected to a vacuum source 220 by a conduit 222. In some aspects, the conduit 222 is flexible, and allows the effluent-capture device 214 to be moved along die 102 in the vicinity of the cleaning operation. In some variants, effluent-capture device 214 is coupled to a movable arm, such as a robotic arm or the like, for moving the effluent-capture device with respect to the die 102.

One or more of EEED 204, scanning device 216 and effluent-capture device 214 are connected to a controller 210, such as a computer system including a processor (not shown). The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in a memory (not shown). The processor may be a number of processors, a multi-processor core or some other type of processor, depending on the particular implementation. Further, the processor may be implemented using a number of heterogeneous processor apparatuses in which a main processor is present with one or more secondary processors on a single chip. As another illustrative example, the processor may be a symmetric multi-processor apparatus containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. In one example, the memory may be configured to store various information in one or more databases. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk read-only-memory (CD-ROM), compact disk read/write memory (CD-R/W), digital video disk memory (DVD), or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium, as described herein, may generally refer to a computer-readable storage medium or computer-readable transmission medium.

In addition to the memory, the processor may also, but need not be, connected to one or more interfaces for displaying, transmitting and/or receiving information. These interfaces may include one or more communications interfaces (none shown) and/or one or more user interfaces. The communications interface may be configured to transmit and/or receive information, such as to and/or from other apparatus(es), network(s) or the like. The communications interface may be configured to transmit and/or receive information by physical (by wire) and/or wireless communications links. Examples of suitable communication interfaces include a network interface controller (NIC), wireless NIC (WNIC) or the like.

The user interfaces may include a display and/or one or more user input interfaces. The display may be configured to present or otherwise display information to a user, suitable examples of which include a liquid crystal display (LCD), light-emitting diode display (LED), plasma display panel (PDP) or the like. The user input interfaces may be by wire or wireless transmission, and may be configured to receive information from a user, such as for processing, storage, and/or display. Suitable examples of user input interfaces include a microphone, image or video capture device, keyboard or keypad, joystick, touch-sensitive surface (separate from or integrated into a touch screen), biometric sensor or the like. The user interfaces may further include one or more interfaces for communicating with peripherals such as printers, scanners or the like.

As indicated above, program code instructions may be stored in memory, and executed by a processor, to implement functions of the system, apparatuses and their respective elements described herein. As will be appreciated, any suitable program code instructions may be loaded onto a computer or other programmable apparatus, e.g., from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

The controller 210 may be operatively coupled to each of the devices by a wired or wireless connection that provides one-way or two-way data transfer between the controller and the devices. In one example, the controller 210 includes an input device 212, such as a keyboard or the like, that allows an operator to input, adjust, or otherwise regulate the operating parameters of the devices connected to the controller. Such operating parameters may include one or more of a laser power, speed, direction of motion, angle of attack, speed of rotation/oscillation of scanning device 216, suction control and location of effluent-capture device 214. For example, in one aspect, the controller 210 is configured with a set of options selectable based upon the size and material of the die and the specific coating to be removed. The available options include one or more predetermined operating parameters for effectively cleaning lubricant 103 from the die 102 without removing or disrupting the oxide coating of the die 102. Such predetermined options may be based on one or more of the lubricant 103 to be removed, the power of the EEED, the material of die 102, the thickness of the lubricant 103, the type and/or thickness of the oxide coating, or other user-determined parameters.

During a cleaning operation, the EEED 204 emits the beam 208, which is directed onto the surface of the die 102 to be cleaned of a lubricant 103. It is to be noted that the energy of the beam 208 and the speed at which it travels across the surface of the die 102 determines, at least in part, the extent to which lubricant 103 is removed from the surface of die 102. In one example, the travel speed of the beam 208 across the surface of die 102 is controllable to be between about 25 millimeters per second to about 200 millimeters per second, or other speeds which enable the lubricant 103 cleaning device to function as described herein. The travel of the beam 208 across the surface of die 102 may be controlled by the movement of arm 206, rotation and/or translation of the scanning device 216, and/or by movement of the die holder 202. For example, when using high power output (e.g., about 10 kW to about 15 kW), the beam 208 may be moved more quickly (e.g., about 125 mm/sec to about 200 mm/sec or greater) across the surface of the die 102 to remove the lubricant 103. Other factors, such as the type of the lubricant 103, and thickness of the lubricant 103 may also affect the rate of removal of lubricant 103 during cleaning. The thickness of the lubricant 103 may be constant, or vary along the surface of die 102. In one example, the thickness of the lubricant 103 may be between about 0.005 to about 0.020 inches. In other variants, the lubricant 103 layer may have other thicknesses. Thus, the operator or controller 210 may adjust the operating parameters of the cleaning system to vary the amount of lubricant 103 removed, or the rate at which the lubricant 103 is removed. In one embodiment, scanning device 216 is controlled to provide overlap of the beam 208 with a portion of the working surface that has been previously irradiated by beam 208.

The beam 208 is configured to have the correct wavelength and sufficient energy to vaporize or otherwise ablate the lubricant 103 from the working surface of the die 102 without disrupting the oxide coating of the die 102, when the beam contacts the lubricant 103 as it traverses the working surface of the die.

In one example, the cleaning system 200 is configured to automatically analyze the surface of the die 102 to determine portions of the surface that require cleaning, such as by measuring a thickness and/or determining a location of the lubricant 103 thereon. The analysis of the surface may be performed by a analyzing device 224 that is operably connected to the controller 210. During analysis, the working surface of the die to be analyzed faces the analyzing device 224. The analyzing device 224 may be an optical, sonic or mechanical analyzing device capable of analyzing the surface of die 102. For example, the analyzing device 224 may be a spectroscopic or ultrasonic coating thickness measurement device, such as a Positector® manufactured by DeFelsko of NY, USA or the like. In another embodiment, analyzing device 224 is a barcode reader or the like configured to identify the die 102 (e.g., by a tool number), such as by reading a barcode or the like, to call up pre-programmed cleaning routines and to locate the die 102 relative to the cleaning system 200.

In one example, the scan of the surface of die 102 is performed before the cleaning operation takes place to determine which locations on the working surface of the die 102 require cleaning. In another example, the scan of the surface is conducted after all or a part of the cleaning operation has taken place, to determine whether the beam 208 has sufficiently removed the lubricant 103, or whether at least one additional cleaning pass of the beam 208 over the working surface, or a portion thereof, of the die 102 is required to remove any remaining lubricant 103. In one alternative, the scan of the working surface of the die 102 may be performed simultaneously with the cleaning operation. The controller 210 may adjust one or more of the operating parameters, discussed above, for effective cleaning of the lubricant 103 from the die 102 based on the data gathered using any of the previously described scanning methodologies. Accordingly, it will be appreciated that adjustment of one or more of the operating parameters of the cleaning system 200 by the controller 210 may take place either a discrete period of time after or concurrently with the cleaning step. For example, if the scan data, gathered as the cleaning operation progresses, indicates that lubricant 103 is only being partially removed from the working surface of the die, the controller 210 may, responsive to this feedback, instantaneously increase the power output of the EEED 204 and/or decrease the travel speed of the beam 208 to ensure optimum removal of the lubricant 103 from the working surface of the die 102. Conversely, responsive to the scanned data, the controller 210 may, for example, instantaneously decrease the power output of the EEED 204 and/or increase the travel speed of the beam 208 to avoid damaging the oxide layer 101. In view of the foregoing, those skilled in the art will appreciate that any number of operating parameters of the cleaning system 200 may be adjusted in a variety of ways based on the scan data received by the controller 210 from the analyzing device 224.

In one example, the die 102 is a die for forming a component of an aircraft, automobile, locomotive or the like. In other embodiments, the die 102 is a general tooling die or the like.

In one example, a plurality of components of the cleaning system 200 are contained in a fully integrated unit. In one aspect, the fully integrated unit includes at least the EEED 204, the scanning device 216, arm 206, die holder 202, and the effluent-capture device 214. An enclosure (not shown) may house the components of the fully integrated unit.

Exemplary embodiments of the systems, methods, and an apparatus for cleaning a lubricant 103 from forming dies are described above in detail. The systems, methods, and apparatus are not limited to the specific embodiments described herein, but rather, components of the systems and apparatus, and/or steps of the methods may be utilized independently and separately from other components and/or steps described herein. For example, the methods may also be used in combination with other cleaning and forming systems, methods, and apparatuses, and are not limited to practice with only the systems, methods, and apparatus as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of cleaning a die having an oxide layer, the method comprising:
   discharging electromagnetic energy towards a working surface of the die having a layer of at least one of graphite and boron nitride thereon, wherein the electromagnetic energy ablates the at least one of graphite and boron nitride such that the layer is removed without removing an oxide layer between the surface of the die and the layer.

2. A method according to claim 1, wherein the electromagnetic energy comprises a laser beam.

3. A method according to claim 1, further comprising capturing an effluent generated when removing the layer.

4. A method according to claim 1, wherein discharging electromagnetic energy comprises discharging electromagnetic energy consistent with a set of operating parameters for an electromagnetic-energy emission device (EEED) that includes at least one of a wavelength and power level of the electromagnetic energy, a speed at which a beam of the electromagnetic energy traverses the working surface, a speed at which the die is moved with respect to a beam of the electromagnetic energy, and a number of times the beam of the electromagnetic energy traverses the working surface along at least a portion of a previously traversed path.

5. A method according to claim 2, further comprising moving the laser beam across the working surface at a speed between about 25 millimeters per second and about 200 millimeters per second.

6. The method according to claim 2, wherein the laser beam has a power output between about 8 kW and about 15 kW.

7. A method according to claim 4, further comprising analyzing the working surface during or after exposing the working surface to the electromagnetic energy and detecting how much of the layer remains on the working surface.

8. A method according to claim 7, further comprising modifying the set of operating parameters based on how much of the layer remains on the working surface.

9. A method of cleaning a die, the method comprising:
   analyzing a working surface of the die with an analyzing device to determine a thickness of a layer of at least one of graphite and boron nitride thereon; and
   based on the thickness of the layer, discharging electromagnetic energy from an electromagnetic-energy emission device (EEED) to irradiate the surface of the die with the electromagnetic energy, wherein the electromagnetic energy ablates the at least one of graphite and boron nitride such that the electromagnetic energy removes the layer without removing an oxide layer between said working surface and said layer.

10. A method according to claim 9, further comprising performing an identification of the die using the analyzing device.

11. A method according to claim 9, wherein said electromagnetic energy is a laser beam.

12. A method according to claim 9 further comprising capturing an effluent generated when removing the layer.

13. A method according to claim 10, further comprising controlling operating parameters of the EEED using a preprogrammed cleaning routine based upon the identification of the die.

14. A method according to claim 10, further comprising modifying operating parameters of the electromagnetic-energy emission device (EEED) based on said identification of the die, said operating parameters including at least one of a wavelength of the electromagnetic energy, a power level of the electromagnetic energy, a speed at which a beam of the electromagnetic energy traverses the working surface, a speed at which the die is moved relative to the beam of the electromagnetic energy, and a number of times the beam traverses the working surface along at least a portion of a previously traversed path.

15. A method according to claim 12, wherein the effluent is captured with a suction device.

\* \* \* \* \*